(12) United States Patent
Tanaka et al.

(10) Patent No.: US 8,613,467 B2
(45) Date of Patent: Dec. 24, 2013

(54) UPPER VEHICLE-BODY STRUCTURE OF VEHICLE

(71) Applicant: Mazda Motor Corporation, Hiroshima (JP)

(72) Inventors: Kazuhiro Tanaka, Kure (JP); Hiroaki Fujii, Hiroshima (JP); Daisuke Kiyoshita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/667,638

(22) Filed: Nov. 2, 2012

(65) Prior Publication Data

US 2013/0119647 A1    May 16, 2013

(30) Foreign Application Priority Data

Nov. 11, 2011  (JP) .................................. 2011-247106

(51) Int. Cl.
  *B60R 21/21*    (2011.01)
  *B60R 21/213*   (2011.01)

(52) U.S. Cl.
  USPC .................. 280/730.2; 280/728.2; 280/730.1; 296/187.03; 296/203.01; 296/210; 296/216.01

(58) Field of Classification Search
  USPC ........................ 280/728.2, 730.1, 730.2, 736; 296/187.13, 187.12, 193.16, 193.12, 296/203.01, 203.03, 210, 216.01–216.08
  See application file for complete search history.

(56) References Cited

U.S. PATENT DOCUMENTS

| | | | | |
|---|---|---|---|---|
| 7,712,775 B2 * | 5/2010 | Sato et al. | ................... | 280/730.2 |
| 7,810,838 B2 * | 10/2010 | Iwayama et al. | ........... | 280/730.2 |
| 7,934,748 B2 * | 5/2011 | Torii | ........................... | 280/730.2 |
| 2006/0261508 A1 * | 11/2006 | Lustiger et al. | ............... | 264/140 |
| 2006/0267315 A1 * | 11/2006 | White, Jr. | .................... | 280/730.2 |
| 2012/0319383 A1 * | 12/2012 | Sugiyama | .................. | 280/728.2 |
| 2013/0119648 A1 * | 5/2013 | Nakamura et al. | ......... | 280/730.2 |

FOREIGN PATENT DOCUMENTS

| | | | |
|---|---|---|---|
| JP | 2009-078695 A | | 4/2009 |
| JP | 2009-262662 A | | 11/2009 |
| JP | 2012201146 A | * | 10/2012 |

* cited by examiner

*Primary Examiner* — Joseph Rocca
*Assistant Examiner* — Darlene P Condra
(74) *Attorney, Agent, or Firm* — Studebaker & Brackett PC

(57) ABSTRACT

A pair of right-and-left center pillars, a pair of right-and-left roof side rails, and an inflator provided on the inside, in a vehicle width direction, of the roof side rails and capable of supplying a gas pressure to an airbag are provided. A roof reinforcing member which extends in the vehicle width direction over respective upper end portions of the center pillars or respective nearby portions to upper ends of the center pillars is provided, which includes a front concave portion and a rear concave portion which are concaved downward respectively. The inflator is arranged such that at least a portion of the inflator overlaps with the roof reinforcing member, and a depth of the rear concave portion overlapping with the inflator is shallower than that of the front concave portion positioned nearer the center pillars.

10 Claims, 10 Drawing Sheets

UPPER VEHICLE-BODY STRUCTURE OF VEHICLE

BACKGROUND OF THE INVENTION

The present invention relates to an upper vehicle-body structure of a vehicle comprising an inflator which is provided on the inside, in a vehicle width direction, of a pair of roof side rails and capable of supplying a gas pressure to an airbag, and in particular, to an upper vehicle-body structure of a vehicle which further comprises a roof reinforcing member arranged in back of a pair of pillars with an offset distance.

Conventionally, in a vehicle equipped with a curtain airbag, the curtain airbag is stored along an inside face, in a vehicle with direction, of a roof side rail in its folded state, and covered with a roof trim at its vehicle-compartment side. Thereby, at a vehicle's side collision or rollover, a gas pressure from an inflator is supplied to the curtain airbag, thereby expanding the curtain airbag and opening a lower end of the roof trim, so that the curtain airbag projects toward the vehicle compartment along a side-window glass and inflates beside a passenger.

Japanese Patent Laid-Open publication No. 2009-262662 discloses a roof structure of a vehicle, which comprises a center frame (roof reinforcement) extending between a pair of right-and-left roof side rails and a load-transmitting member (gusset) connected to the roof side rails and the center frame and capable of adjusting a bending stress occurring at the center frame at a vehicle side collision. Herein, a curtain airbag in a stored state is arranged below the center frame and between an inside face, in the vehicle width direction, of the roof side frame and an outside end, in the vehicle width direction, of the center frame.

In general, the curtain airbag in the stored state may be configured to be used in common as a front airbag for a passenger seated in a front seat and a rear airbag for a passenger seated in a rear seat, so that the curtain airbag is provided to extend longitudinally over a center pillar positioned between the front seat and the rear seat. Accordingly, the inflator is arranged at around a position right above the center pillar which is located at a longitudinally-central position of the curtain airbag in order to stabilize an inflation performance of the curtain airbag for the front-seat passenger and the rear-seat passenger by equally supplying the gas pressure to the airbag for front seat as well as the airbag for rear seat.

Japanese Patent Laid-Open publication No. 2009-78695 discloses an upper vehicle-body structure of a vehicle, which comprises a pair of right-and-left center pillars, a pair of right-and-left roof side rails extending in a vehicle longitudinal direction, a roof reinforcing member extending in a vehicle width direction over the pair of center pillars, a curtain airbag arranged on the inside, in the vehicle width direction, of each of the roof side rails, and an inflator capable of supplying a gas pressure to the curtain airbag. Herein, the inflator is arranged in back of the roof reinforcement and at an inside face, in the vehicle width direction, of the roof side rail.

Herein, there is a desire of lowering the vehicle's height to improve the aerodynamic resistance of a vehicle or from a designing perspective, or there is a desire of enlarging an ingress-and-egress opening to improve easy ingress and egress of passengers. Accordingly, it may be preferable that the vertical width of the roof side rail be made smaller. However, since the inflator is arranged below the center frame, i.e., in a storage recess portion which is formed at the roof side rail in the above-described first patent document, it is necessary that the roof side rail ensures an arrangement space by arranging the inflator and the center frame in a vertical direction, so that it may not be easy to make the vertical width of the roof side rail properly small, keeping an appropriate installation of the curtain airbag to a vehicle body.

Since the inflator is arranged at an offset position rearward from the roof reinforcement in the upper vehicle-body structure of a vehicle disclosed in the above-described second patent document, the roof reinforcement and the inflator can be positioned at the same level, so that the vertical width of the roof side rail can be made smaller. However, in a case in which the arrangement position of the inflator is offset longitudinally from the longitudinally-central position of the curtain airbag configured to be used in common as a front-seat airbag and a rear-seat airbag, there occurs a difference in the gas-supply time between the supply to the front-seat airbag and the supply to the rear-seat airbag. Accordingly, the expansion characteristics of the front-seat airbag becomes different from those of the rear-seat airbag, so that there is a concern that the stable inflation of the curtain airbag for both a passenger seated in the front seat and a passenger seated in the rear seat may not be ensured.

Further, there has been recently a tendency of diversity of vehicle design, such as a large-sized opening portion of a sunroof or the like, or an increase of a windshield's slant angle. In order to achieve this diversity of vehicle design, it may be required to arrange the roof reinforcement interconnected the right and left center pillars in back of the center pillars. Accordingly, the inflator is offset further rearward from the longitudinally-central position of the curtain airbag, so that there is a concern that the offset amount of the possible arrangement position of the inflator from the best arrangement position (around the position right above the center pillar) of the inflator for its stable inflation may be improperly large.

SUMMARY OF THE INVENTION

An object of the present invention is to provide an upper vehicle-body structure of a vehicle which can ensure the stable inflation of the airbag for the both passengers seated in the front and rear seats, arranging the roof reinforcing member in back of the pillars with an offset distance.

According to the present invention, there is provided an upper vehicle-body structure of a vehicle, comprising a pair of right-and-left pillars provided at right and left side portions of the vehicle and extending vertically, a pair of right-and-left roof side rails connected to respective upper ends of the pillars and extending in a vehicle longitudinal direction, a roof reinforcing member extending in a vehicle width direction over respective upper end portions of the pillars or respective nearby portions to the upper ends of the pillars, the roof reinforcing member including a concave portion which is concaved downward, and an inflator provided on the inside, in the vehicle width direction, of each of the pair of roof side rails and capable of supplying a gas pressure to an airbag, wherein the inflator is arranged such that at least a portion of the inflator overlaps with the roof reinforcing member in the vehicle longitudinal direction, and the concave portion is configured such that a depth of a part of the concave portion which overlaps with the inflator is shallower than that of anther part of the concave portion which is positioned nearer the pillars than the part of the concave portion overlapping with the inflator is.

According to the present invention, since at least a portion of the inflator overlaps with the roof reinforcing member in the vehicle longitudinal direction, the inflator can be arranged properly close to the position right above the center pillar which may be the best position for the stable inflation of the airbag, thereby ensuring the stable inflation of the airbag for the both passengers seated in the front and rear seats. Further, since the depth of the part of the concave portion overlapping with the inflator is shallower than that of the other part of the concave portion positioned nearer the pillars than the part of the concave portion overlapping with the inflator is, even in the structure in which the roof reinforcing member is arranged in back of the pillars with such an offset distance, the vertical width of the roof side rail can be made smaller, keeping the appropriate installation of the airbag to the vehicle body.

According to an embodiment of the present invention, the roof reinforcing member is arranged in back of the pillars with an offset distance and further includes a slant portion which is formed at an end portion of the roof reinforcing member and slants outward and downward, the concave portion is provided to extend inward, in the vehicle width direction, from the end portion of the roof reinforcing member, and the concave portion is comprised of plural concave portions which are arranged away from each other in the vehicle longitudinal direction, a foremost concave portion of which is configured such that an outside end portion thereof approaches gradually closer to the pillars along the slant portion, a rearmost concave portion of which is configured such that an outside end portion thereof goes rearward gradually further away from the foremost concave portion and the depth thereof is shallower than that of the foremost concave portion. Thereby, since the plural concave portions are provided and the distance between the foremost concave portion and the rearmost concave portion is configured to increase gradually toward the outside in the vehicle width direction, a connection portion of the roof reinforcing member and the roof side rail is hardened, so that the load acting on the pillar can be efficiently transmitted to the roof reinforcing member via the roof side rail. Further, since the depth of the rearmost concave portion is shallower than that of the foremost concave portion, any interference of the rearmost concave portion with the inflator can be prevented.

According to another embodiment of the present invention, outside end portions, in the vehicle width direction, of the concave portion and inside end portions, in the vehicle width direction, of the roof side rails are arranged to face to each other and away from each other. Thereby, an impact load acting on the pillars can be absorbed by the portion of the roof reinforcing member away from the roof side rail at the vehicle side collision, and after the roof side rail contacts the roof reinforcing member, the impact load can be transmitted to another vehicle-body forming member via the roof reinforcing member. Accordingly, both the impact absorption and the impact transmission can be properly achieved, preventing any interference with the inflator.

According to another embodiment of the present invention, a sunroof is provided at a roof of the vehicle, a peripheral-frame reinforcing member to reinforce a connection portion of the roof reinforcing member to the pillars is provided at a peripheral frame of the sunroof, and the peripheral-frame reinforcing member and the concave portion of the roof reinforcing member form together a closed cross section. Thereby, the connection of the pillars and the roof reinforcing member can be strengthened by utilizing the peripheral-frame reinforcing member, so that the impact load acting on the pillars can be efficiently transmitted to the roof reinforcing member via the roof side rails.

According to another embodiment of the present invention, an assist-grip attachment seat portion which projects toward the inside of a vehicle compartment is provided at an inside portion, in the vehicle width direction, of a specified portion of the roof side rail which is located further away from the pillar than the roof reinforcing member in the vehicle longitudinal direction, the inflator and the airbag are arranged above and below the assist-grip attachment seat portion, respectively, the inflator is arranged such that a portion thereof positioned nearer the pillar approaches closer to a lower edge portion of the roof side rail, and the airbag comprises a connection portion which is coupled to an end portion of the inflator positioned on the side of the pillar. Thereby, the inflator and the airbag can be arranged compactly, avoiding a position of the assist-grip attachment seat portion properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. Herein, the embodiments will be described by omitting a roof trim and a pillar trim which cover an inside portion of a vehicle compartment for convenience, and the terms of "longitudinally" and "laterally" are used to express respective directions relative to a forward direction of a vehicle.

Embodiment 1

Figure 1:
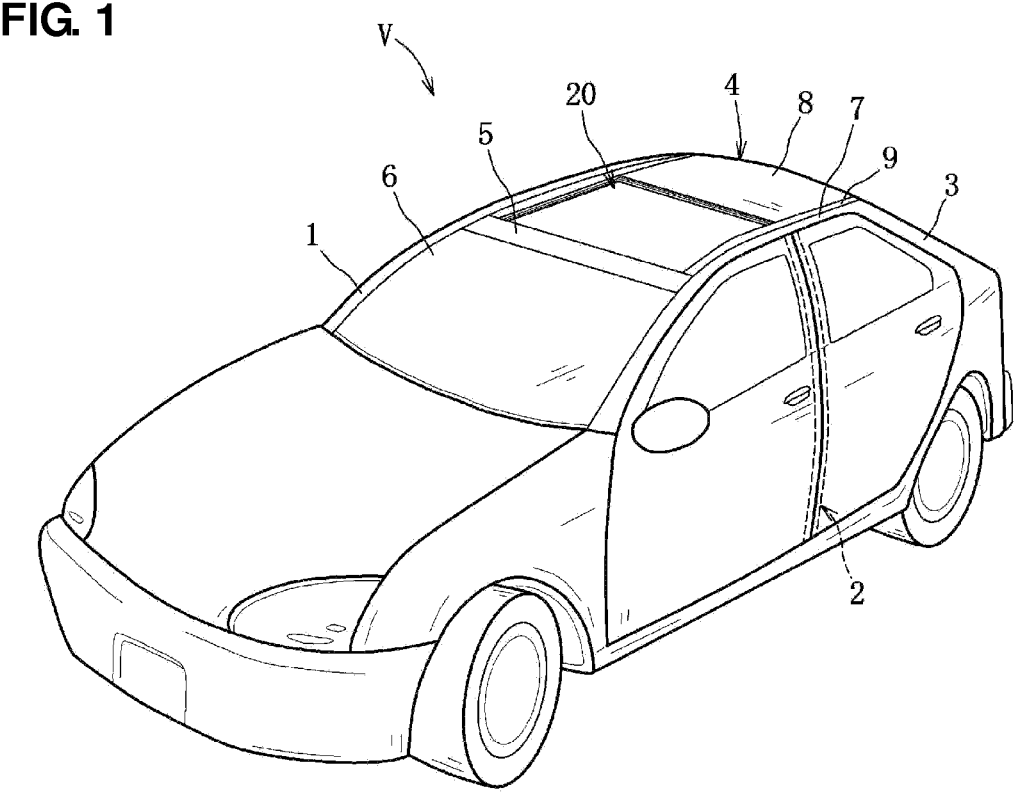
FIG. 1 is a perspective view of a whole part of a vehicle according to a first embodiment of the present invention.
Figure 2:
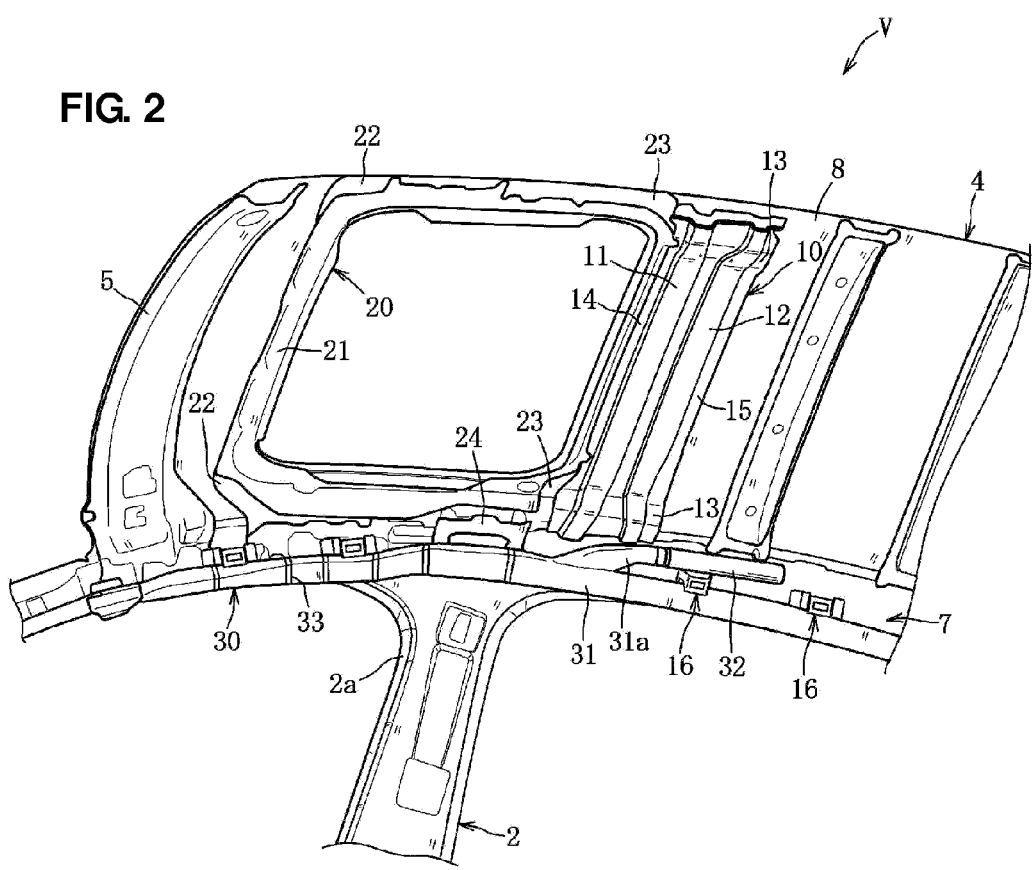
FIG. 2 is a perspective view of an upper vehicle-body structure of the vehicle, when viewed from an inside of a vehicle compartment.
Figure 3:
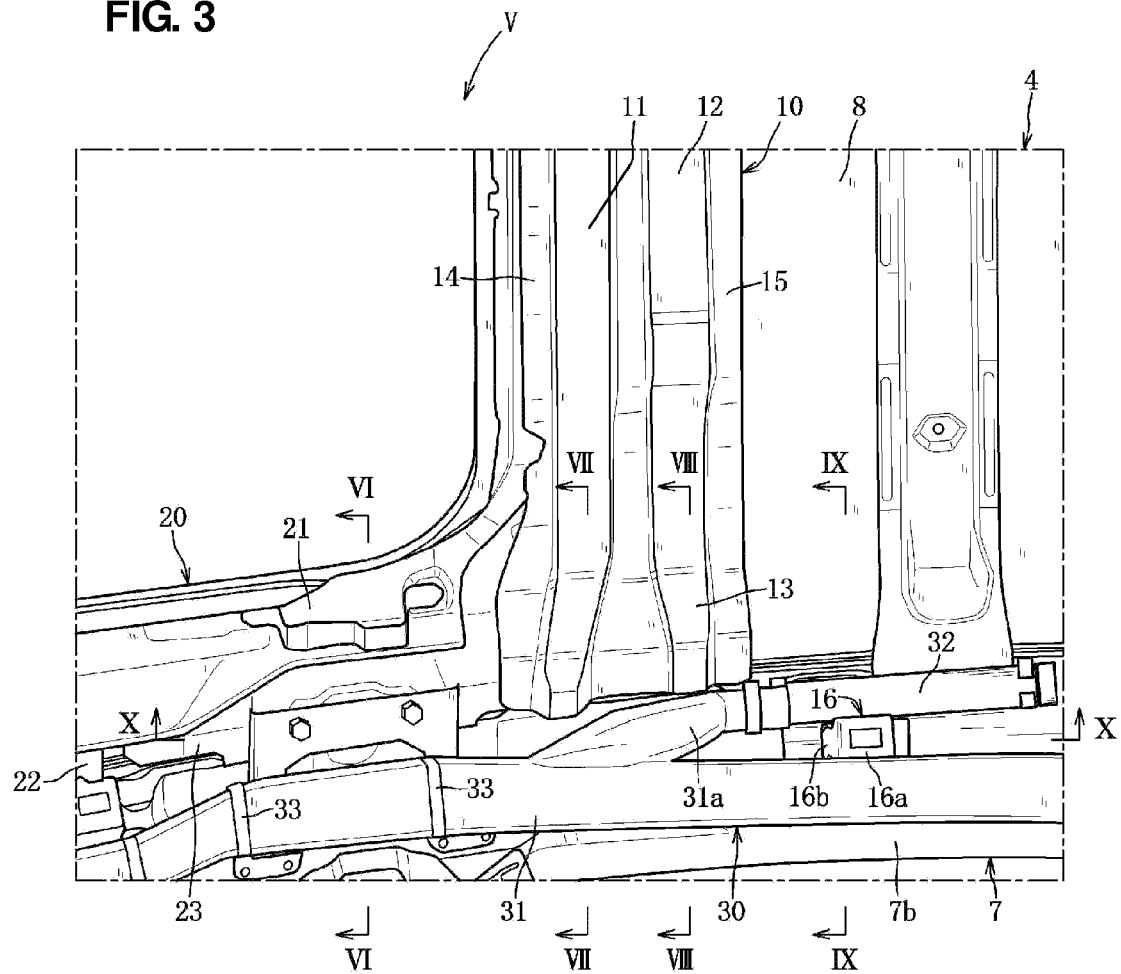
FIG. 3 is an enlarged plan view of a major portion of FIG. 2.
Figure 4:
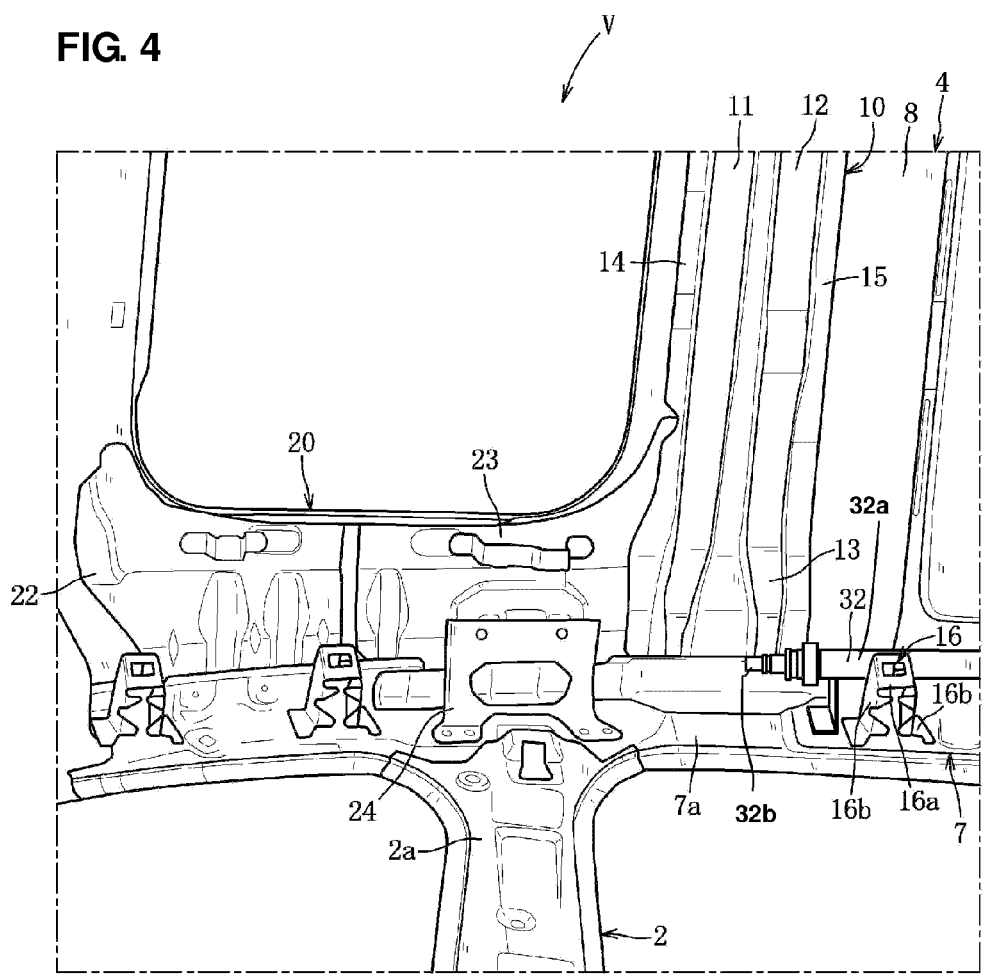
FIG. 4 is a view showing a state in which an outer frame member of a sunroof and an airbag are detached from the state of FIG. 3.
Figure 5:
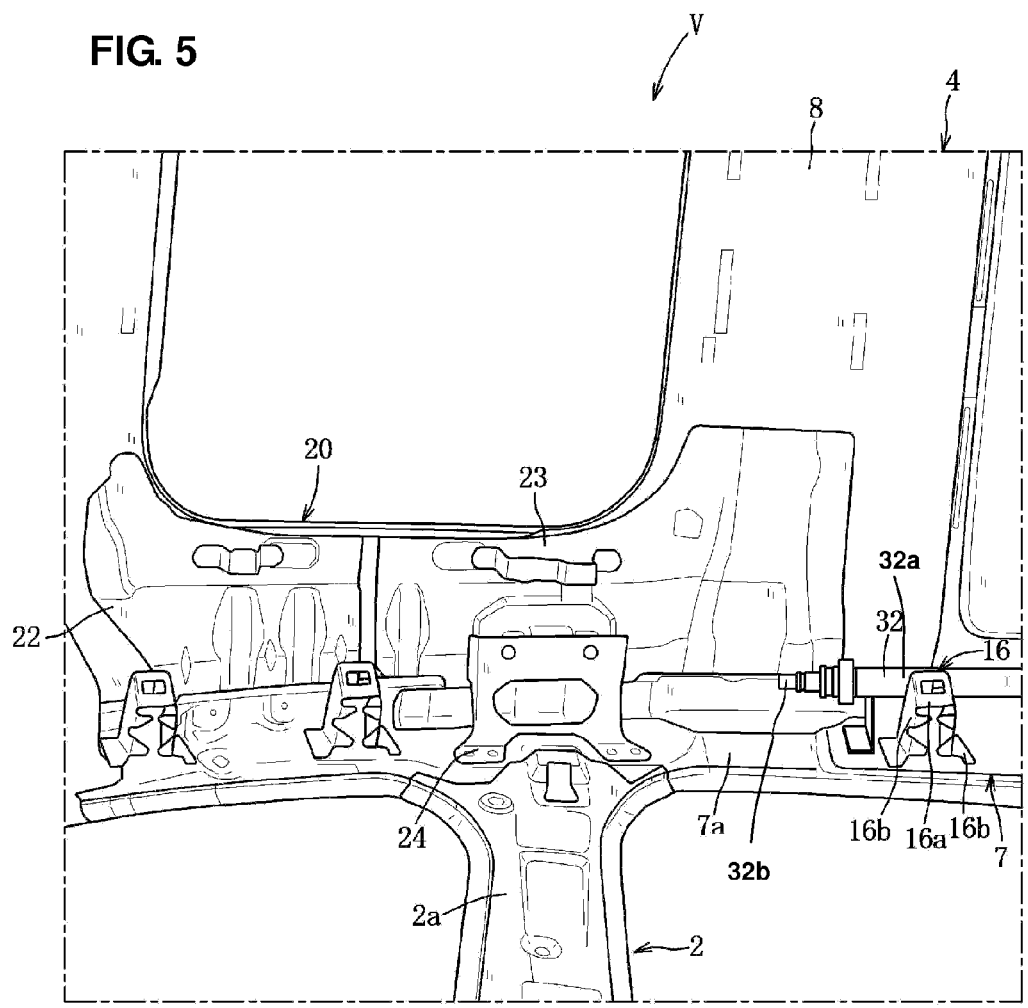
FIG. 5 is a view showing a state in which a roof reinforcement is detached from the state of FIG. 4.

A first embodiment of the present invention will be described referring to FIGS. 1 through 10. As shown in FIGS. 1 and 2, a vehicle V of the present embodiment comprises a pair of right-and-left front pillars 1, a pair of right-and-left center pillars 2, a pair of right-and-left rear pillars 3, a roof 4 which is equipped with a sunroof unit 20 at its front-side portion, a pair of right-and-left curtain airbag unit 30, and others. As shown in FIG. 1, a front header 5 which extends in a vehicle width direction is provided at an upper end portion of the pair of front pillars 1, to which an upper portion of a windshield (front window glass) 6 is attached.

Figure 6:
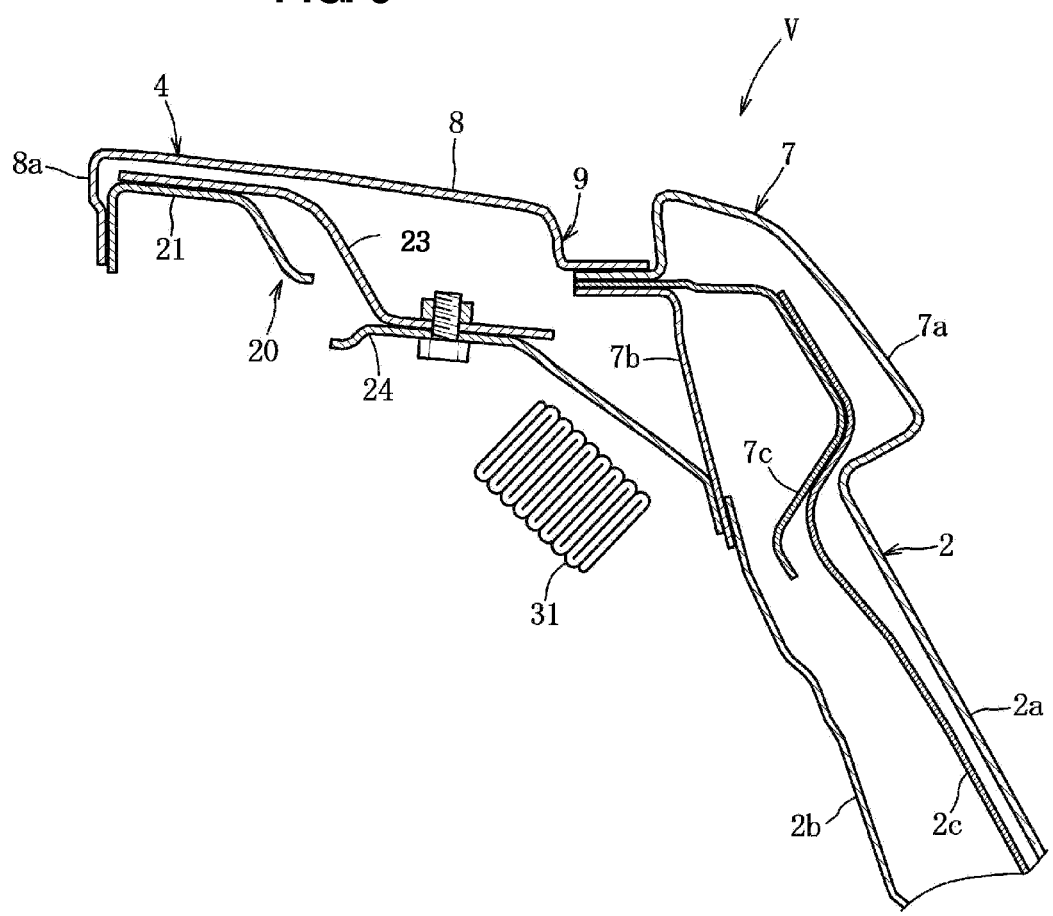
FIG. 6 is a sectional view taken along line VI-VI of FIG. 3.
Figure 7:
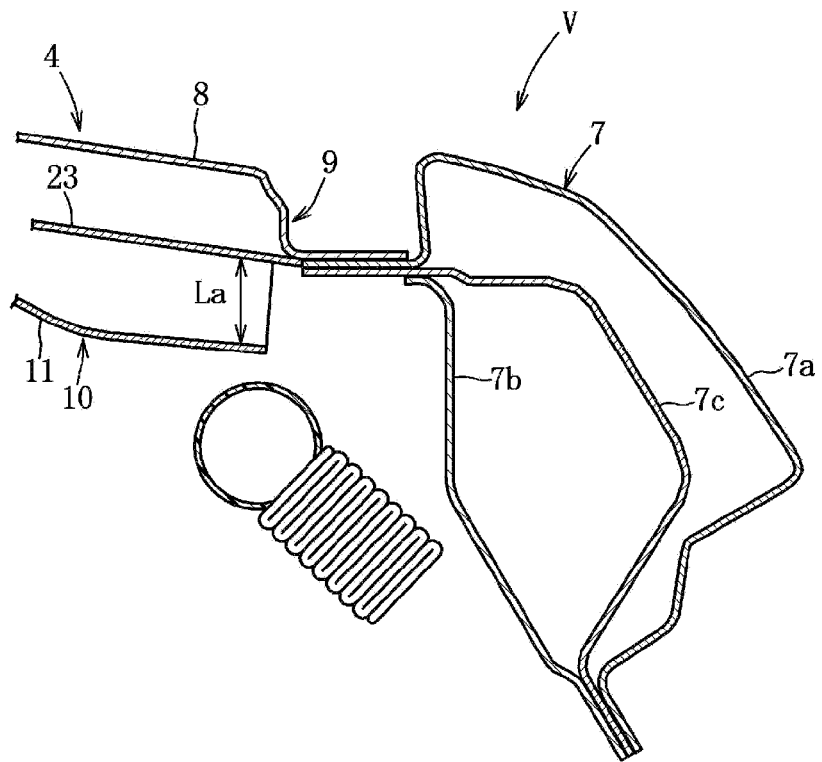
FIG. 7 is a sectional view taken along line VII-VII of FIG. 3.

As shown in FIGS. 1 and 2, the pair of center pillars 2 is provided at a central position between a frond seat (not illustrated) and a rear seat (not illustrated). As shown in FIG. 6, the right-side center pillar 2 has a closed cross section extending vertically which is formed by a center pillar outer 2a and a center pillar inner 2b, and a pillar reinforcement 2c which splits the closed cross section into two parts is provided to extend vertically.

Next, the roof 4 will be described. As shown in FIGS. 1 through 10, the roof 4 comprises a pair of right-and-left roof side rails 7 which extends longitudinally in an arch shape with a central portion projecting upward, a roof panel 8, a pair of right-and-left groove portions 9 which extends longitudinally at both-side end portions of the roof panel 8, a roof reinforcement 10 (roof reinforcing member) which extends in the vehicle width direction over respective nearby portions to upper ends of the pair of center pillars 2, the sunroof unit 20 which is provided at the front-side portion of the roof 4, and others. Herein, the roof 4 is symmetrical, so a right-side structure of the roof 4 will be described mainly.

As shown in FIGS. 6 through 9, the right-side roof side rail 7 forms a closed cross section extending longitudinally which is formed by a roof side rail outer 7a and a roof side rail inner 7b, and a roof side rail reinforcement 7c which splits the closed cross section into two parts is provided to extend longitudinally. As shown in FIG. 6, the closed cross section of the roof side rail 7 connects to the above-described closed cross section of the enter pillar 2 at a longitudinally-central position of that, and an upper portion of the pillar reinforcement 2c is joined to the roof side rail reinforcement 7c.

The roof side rail outer 7a is configured to protrude upward and toward the outside in the vehicle width direction, and is formed integrally with the center pillar outer 2a extending downward at a longitudinally-central portion of that. At an inside end portion, in the vehicle width direction, of the roof side rail outer 7a is formed a dent portion extending longitudinally. This dent portion of the roof side rail outer 7a is joined to a dent portion which is formed at an outside portion of the roof panel 8, which form together the above-described groove portion 9.

As shown in FIGS. 6 through 9, the roof side rail inner 7b includes a vertical portion extending vertically at an inside portion, in the vehicle width direction, of that. An inside end portion of this vertical portion of the roof side rail inner 7b extends substantially horizontally to the groove portion 9, where four members of this inside end portion of the vertical portion of the roof side rail inner 7b, the above-described dent portions of the roof panel 8 and the roof side rail inner 7a, and an inside end portion of the roof side rail reinforcement 7c are joined together. A lower end portion of the roof side rail inner 7b is joined to an upper end portion of the center pillar inner 2b at a specified portion of that which is connected to the center pillar 2 (at its longitudinally-midway portion), and joined to a lower end portion of the roof side rail outer 7a and a lower end portion of the roof side rail reinforcement 7c together at the other portion of that.

As shown in FIGS. 2 through 4 and 10, the roof reinforcement 10 is arranged in back of the pair of center pillars 2 with an offset distance. The roof reinforcement 10 includes a front concave portion 11 which has a U-shaped section extending over a vehicle-width-direction whole width, a rear concave portion 12 which is provided in back of the front concave portion 11 and has a U-shaped section extending substantially in parallel to the front concave portion 11 over the vehicle-width-direction whole width, and a pair of right-and-left slant portion 13 which is formed at its end portion and slants obliquely outward and downward.

As shown in FIGS. 2 through 4 and 7, the front concave portion 11 has a concave depth of La and is configured such that its outside end approaches gradually closer to the center pillar 2 along the slant portion 13. At a front end portion of the front concave portion 11 is provided a front flange 14 extending in the vehicle width direction, and the front flange 14 is joined to a back face of a rear peripheral-frame reinforcing member 23 described later which is arranged substantially at the same level as a bottom portion of the groove portion 9. Accordingly, a closed cross section which extends in the vehicle width direction is formed between the front concave portion 11 and the rear peripheral-frame reinforcing member 23, and an outside end portion, in the vehicle width direction, of the front concave portion 11 is arranged to face to and away from the vertical portion of the roof side rail inner 7b via the groove portion 9.

Figure 8:
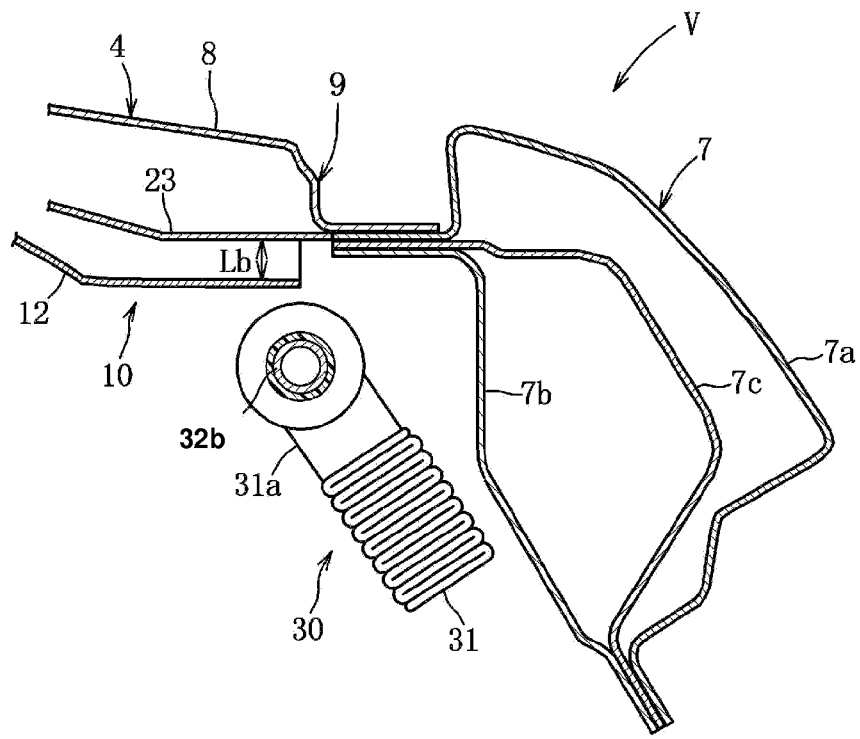
FIG. 8 is a sectional view taken along line VIII-VIII of FIG. 3.

As shown in FIG. 8, the depth Lb of rear concave portion 12 is shallower than the depth La of the front concave portion 11. A rear flange 15 which extends in the vehicle width direction is provided at a rear end portion of the rear concave portion 12 and joined to a back face of the rear peripheral-frame reinforcing member 23 arranged substantially at the same level as the bottom portion of the groove portion 9. Accordingly, a closed cross section which extends in the vehicle width direction is formed between the rear concave portion 12 and the rear peripheral-frame reinforcing member 23, and an outside end portion, in the vehicle width direction, of the rear concave portion 12 is arranged to face to and away from the vertical portion of the roof side rail inner 7b via the groove portion 9.

As shown in FIGS. 2 through 5 and 9, a pair of front-and-rear assist-grip attachment seat portions 16 is provided at a longitudinally-central portion of the ingress-and-egress opening for rear seat of the inside portion, in the vehicle width direction, of the roof side rail inner 7b to project obliquely downward and toward the vehicle compartment. Each front-and-rear assist-grip attachment seat portion 16 comprises a grip attachment seat 16a and a pair of front-and-rear leg portions 16b which extends toward the vehicle outside from front and rear end portions of the grip attachment seat 16a, respectively. Respective outside end portions of the leg portions 16b are joined to the roof side rail inner 7b. The front assist-grip attachment seat portion 16 is provided in back of the roof reinforcement 10.

Next, the sunroof unit 20 will be described. As shown in FIGS. 1 through 6 and 10, the sunroof unit 20 is provided between the front header 5 and the roof reinforcement 10, and comprises a sunshade (not illustrated), such as a slide roof opening/closing a rectangular opening portion 8a of the roof panel 8, a rectangular outer-frame member 21 (peripheral-frame) which forms the opening portion 8a, a pair of right-and-left front peripheral-frame reinforcing members 22 which reinforces a front-side corner portion of the outer-frame member 21, the pair of right-and-left rear peripheral-frame reinforcing members 23 which reinforces a rear-side corner portion of the outer-frame member 21, a pair of right-and-left guide rails (not illustrated) which supports the sunshade sliding, and others.

A peripheral portion of the outer-frame member 21 is connected to the roof panel 8 and the front flange 14 of the roof reinforcement 10, and at an inner-peripheral right-and-left edge portion of the outer-frame member 21 is provided a pair of right-and-left guide rails. Each of the pair of right-and-left front peripheral-frame reinforcing members 22 is made of an L-shaped steel plate, and fixed to an upper portion of the outer-frame member 21. The front peripheral-frame reinforcing members 22 are welded to the roof panel 8 and the groove portion 9 at plural positions.

Each of the pair of right-and-left rear peripheral-frame reinforcing members 23 is made of an L-shaped steel plate, and fixed to an upper portion of the outer-frame member 21. The rear peripheral-frame reinforcing members 23 are welded to the roof panel 8, the groove portion 9, and the front flange 14 of the roof reinforcement 10 at plural positions. Thereby, a connection portion of the roof reinforcement 10 to the center pillar 2 can be reinforced. Thus, the load inputting to the center pillar 2 is transmitted to the roof reinforcement 10 via the rear peripheral-frame reinforcing member 23. As shown in FIGS. 2 through 6 and 10, a pair of right-and-left gussets 24 is connected to respective lower portions of outside portions of the pair of right-and-left rear peripheral-frame reinforcing members 23.

The gusset 24 is made of a steel plate and arranged over the center pillar inner 2b and the rear peripheral-frame reinforcing member 23 such that the level of its inside portion becomes higher. A lower end portion of the gusset 24 is joined to a lower end portion of the roof side rail inner 7b and an upper end portion of the center pillar inner 2b at its longitudinally-midway portion. An upper end portion of the gusset 24 is fastened, by bolts, to two weld nuts 24a which are fixed to the upper portion of the rear peripheral-frame reinforcing member 23.

Next, the pair of right-and-left curtain airbag units 30 will be described. The right-and-left curtain airbag units 30 are arranged on the inside of the pair of right-and-left roof side rail inners 7b. Herein, the right-and-left curtain airbag units 30 are symmetrical, so a structure of the right-side curtain airbag unit 30 will be described mainly.

As shown in FIGS. 2 through 10, the curtain airbag unit 30 comprises an airbag 31 which inflates in a curtain shape along a side wall of the vehicle compartment, an inflator 32 which is capable of supplying a gas pressure to the airbag 31, and others. The airbag 31 comprises an inflation portion for front seat, an inflation portion for rear seat which is integrally continuous from the inflation portion for front seat, a connection portion 31a which extends obliquely rearward and upward from a central position of the both inflation portions, and others.

The airbag 31 is held by a binding member 33 which is breakable in a stored state of the airbag 31 in which the airbag 31 is folded in bellows shape or roll shape. The airbag 31 in the stored state extends longitudinally over the center pillar 2 in an arch shape with a central portion projecting upward, and is arranged along the roof side rail inner 7b over a whole length of respective upper edge portions of the ingress-and-egress opening for front seat and the ingress-and-egress opening for rear seat. The airbag 31 in the stored state is fixed to the roof side rail inner 7b below the front assist-grip attachment portion 16 projecting obliquely downward and toward the vehicle compartment from the roof side rail inner 7b at plural positions.

The inflator 32 supplies the gas pressure to the airbag 31 at a side collision or rollover of the vehicle V. As shown in FIGS. 2 through 5 and 10, the inflator 32 comprises a cylindrical body portion 32a and a gas-pressure supply port 32b which is provided at a front tip of the body portion 32a and connects to the connection portion 31a, and is attached at the inside portion of the roof side rail inner 7b between the center pillar 2 and the rear assist-grip attachment seat portion 16 in a state in which an axis of the inflator 32 extends in the vehicle longitudinal direction.

Figure 10:
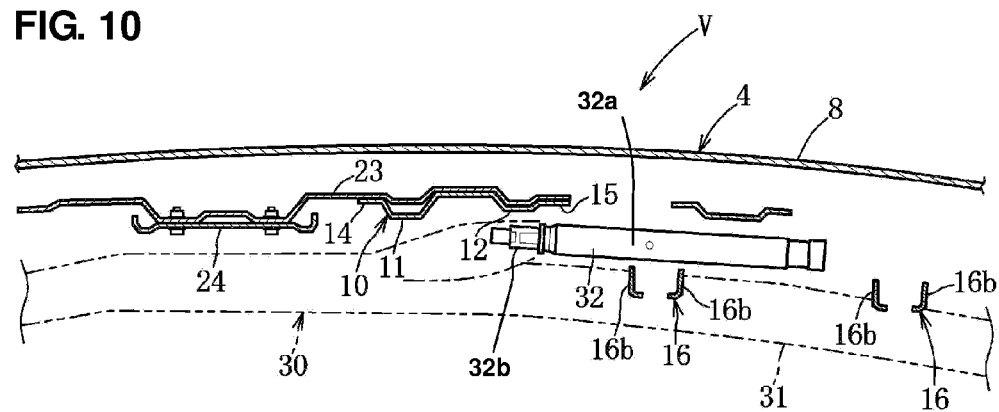
FIG. 10 is a sectional view taken along line X-X of FIG. 3.

As shown in FIG. 10, the inflator 32 is arranged above the front assist-grip attachment seat portion 16 and below an end portion, in the vehicle width direction, of the roof reinforcement 10 such that the gas-pressure supply port 32b is positioned below the rear concave portion 12 with a specified distance and the front end portion of the body portion 32a is positioned below the rear flange 15 with a specified distance. Thus, the inflator 32 is configured such that at least a portion of the inflator 32 overlaps with the roof reinforcement 10.

Figure 9:
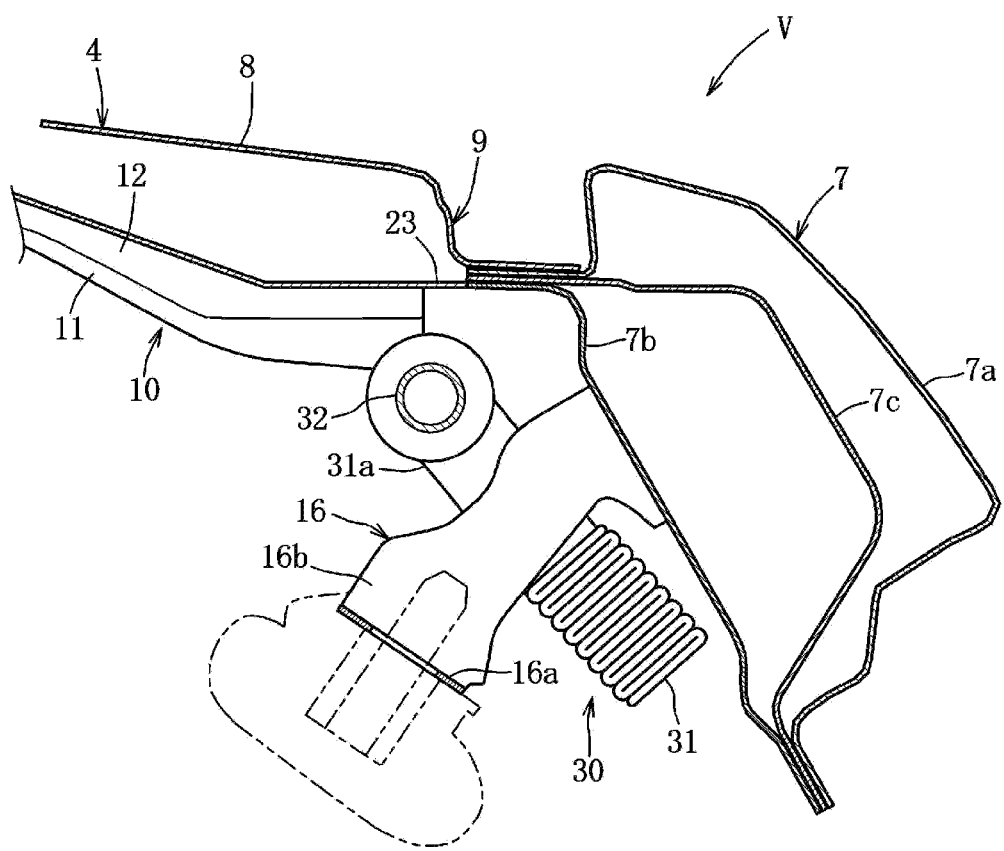
FIG. 9 is a sectional view taken along line IX-IX of FIG. 3.

As shown in FIG. 9, the inflator 32 is arranged on the inside and above the airbag 31 in the stored state at a position corresponding to the front assist-grip attachment seat portion 16, and also, as shown in FIG. 2, this inflator 32 is arranged to slant obliquely rearward and upward relative to the side rail 7 such that a portion thereof positioned nearer the center pillar 2 approaches closer to a lower edge portion of the roof side rail 7.

Hereinafter, the operations and effects of the upper vehicle-body structure of the vehicle V according to the first embodiment will be described.

Since at least a portion of the inflator 32 overlaps with the roof reinforcement 10 in the vehicle longitudinal direction in the upper vehicle-body structure of the vehicle V, the inflator 32 can be arranged properly close to the position right above the center pillar 2 which may be the best position for the stable inflation of the curtain airbag unit 30, thereby ensuring the stable inflation of the curtain airbag unit 30 for the both passengers seated in the front and rear seats. Further, since the depth Lb of the rear concave portion 12 positioned at a part of the roof reinforcement 10 overlapping with the inflator 32 is shallower than the depth La of the front concave portion 11 positioned nearer the center pillars 2, even in the structure in which the roof reinforcement 10 is arranged in back of the center pillars 2 with the offset distance, the vertical width of the roof side rail 7 can be made smaller, keeping the appropriate installation of the curtain airbag unit 30 to the vehicle body.

The roof reinforcement 10 is arranged in back of the center pillars 2 with the offset distance and further includes the slant portion 13 which is formed at the end portion of the roof reinforcement 10 and slants obliquely outward and downward, and the plural concave portions 11, 12 are provided to extend inward, in the vehicle width direction, from the end portion of the roof reinforcement 10. The front concave portion 11 is configured such that its outside end portion approaches gradually closer to the center pillars 2 along the slant portion 13, and the rear concave portion 12 is configured such that its outside end portion goes rearward gradually further away from the front concave portion 11 and the depth Lb of the rear concave portion 12 is shallower than the depth La of the front concave portion 11. Thereby, since the plural concave portions 11, 12 are provided and the distance between these concave portions 11, 12 is configured to increase gradually toward the outside in the vehicle width direction, the connection portion of the roof reinforcement 10 and the roof side rail 7 is hardened, so that the load acting on the center pillar 2 can be efficiently transmitted to the roof reinforcement 10 via the roof side rail 7. Further, since the depth Lb of the rear concave portion 12 is shallower than the depth La of the front concave portion 11, any interference of the rear concave portion 12 with the inflator 32 can be prevented.

Since the outside end portions, in the vehicle width direction, of the concave portions 11, 12 and the inside end portions, in the vehicle width direction, of the roof side rails 7 are arranged to face to each other and away from each other, the impact load acting on the center pillars 2 can be absorbed by the portion of the roof reinforcement 10 away from the roof side rail 7 at the vehicle side collision, and after the roof side rail 7 contacts the roof reinforcement 10, the impact load can be transmitted to another vehicle-body forming member via the roof reinforcement 10. Accordingly, both the impact absorption and the impact transmission can be properly achieved, preventing any interference with the inflator 32.

The sunroof 20 is provided at the roof 4, the rear peripheral-frame reinforcing member 23 to reinforce the connection portion of the roof reinforcement 10 to the center pillars 2 is provided at the outer-frame member 21 of the sunroof 20, and the rear peripheral-frame reinforcing member 23 and the concave portions 11, 12 of the roof reinforcement 10 form together the closed cross section. Thereby, the connection of the center pillars 2 and the roof reinforcement 10 can be strengthened by utilizing the rear peripheral-frame reinforcing member 23, so that the impact load acting on the center pillars 2 can be efficiently transmitted to the roof reinforcement 10 via the roof side rails 7.

The front assist-grip attachment seat portion 16 which projects toward the inside of the vehicle compartment is provided at the inside portion, in the vehicle width direction, of a specified portion of the roof side rail 7 which is located further away from the center pillar 2 than the roof reinforcement member 10 in the vehicle longitudinal direction, the inflator 32 and the airbag 31 are arranged above and below the assist-grip attachment seat portion 16, respectively, the inflator 32 is arranged such that a portion thereof positioned nearer the center pillar 2 approaches closer to a lower edge portion of the roof side rail 7, and the airbag 31 comprises the connection portion 31a which is coupled to the gas-pressure supply port 32b of the inflator 32 positioned on the side of the center pillar 2. Thereby, the inflator 32 and the curtain airbag unit 30 can be arranged compactly, avoiding the position of the front assist-grip attachment seat portion 16 properly.

Embodiment 2

Figure 11:
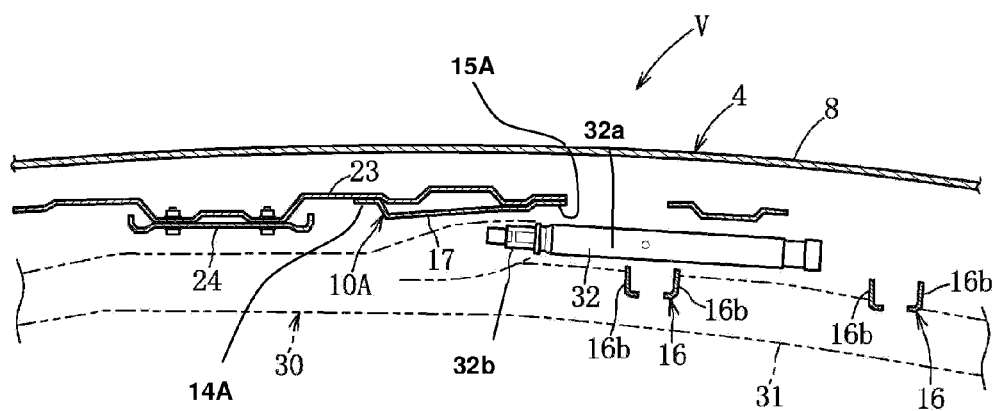
FIG. 11 is a sectional view according to a second embodiment, which corresponds to FIG. 10.

Next, an upper vehicle-body structure of the vehicle V according to a second embodiment 2 will be described referring to FIG. 11. Only structures of the second embodiment which are different from the above-described first embodiment will be described. The same references are used to denote the same members as the first embodiment, and descriptions of those are omitted.

A roof reinforcement 10A is arranged in back of the pair of center pillars 2 with an offset distance, and includes a wedge-shaped concave portion 17 which has a wedge-shaped section extending over a vehicle-width-direction whole width. The wedge-shaped concave portion 17 is configured such that its bottom portion slants obliquely rearward and upward, that is—its rear depth is becomes shallower. A front flange 14A and a rear flange 15A are provided at a front end portion and a rear end portion of the wedge-shaped concave portion 17, and joined to a back face of the rear peripheral-frame reinforcing member 23. Thus, a closed cross section extending in the vehicle width direction is formed between the wedge-shaped concave portion 17 and the rear peripheral-frame reinforcing member 23, and an outside end portion, in the vehicle width direction, of the wedge-shaped concave portion 17 is arranged to face to and away from the vertical portion of the roof side rail inner 7b via the groove portion 9. Thereby, the roof reinforcement 10A can be simplified and the similar effects to the first embodiment can be provided.

Additionally, some partially-modified examples of the above-described embodiments will be described.

While the above-described embodiments 1 and 2 disclose the examples in which the roof reinforcement is provided in back of the center pillars with the offset distance, the roof reinforcement may be provided in back of any other pillar than the center pillar according to a vehicle design of vehicle equipped with a three-row seat or the like. Further, the present invention is applicable to any roof reinforcement which is arranged in front of the pillar. Moreover, the present invention is also applicable to any roof reinforcement which is arranged to include the upper end portion of the pillar and extend forward or rearward from the upper end of the pillar.

Figure 12:
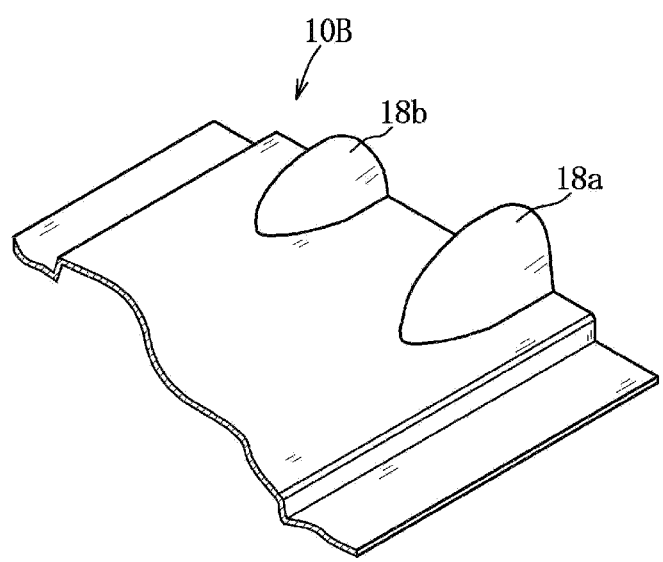
FIG. 12 is a view of a modified example of the roof reinforcement.

While the above-described embodiments 1 and 2 disclose the examples in which the concave portion extends over a vehicle-width-direction whole width of the roof reinforcement, a pair of bead-shaped concave portions 18a, 18b may be formed partially at both-side end portions of a roof reinforcement 10B as shown in FIG. 12. In this case, the depth of the bead-shaped concave portion 18b which overlaps with the inflator is configured to be shallower than that of the bead-shaped concave portion 18a which does not overlap with the inflator.

The present invention should not be limited to the above-described embodiments and modified examples, and any other further modifications or improvements may be applied within the scope of a sprit of the present invention.

What is claimed is:

1. An upper vehicle-body structure of a vehicle, comprising:
a pair of right-and-left pillars provided at right and left side portions of the vehicle and extending vertically;
a pair of right-and-left roof side rails connected to respective upper ends of the pillars and extending in a vehicle longitudinal direction;
a roof reinforcing member extending in a vehicle width direction over respective upper end portions of the pillars or respective nearby portions to the upper ends of the pillars, the roof reinforcing member including a concave portion which is concaved downward; and
an inflator provided on the inside, in the vehicle width direction, of the pair of roof side rails and capable of supplying a gas pressure to an airbag,
wherein said inflator is arranged such that at least a portion of the inflator overlaps with said roof reinforcing member in the vehicle longitudinal direction, and said concave portion is configured such that a depth of a part of the concave portion which overlaps with the inflator is shallower than that of another part of the concave portion which is positioned nearer said pillars than said part of the concave portion overlapping with the inflator is.

2. The upper vehicle-body structure of a vehicle of claim 1, wherein said roof reinforcing member is arranged in back of said pillars with an offset distance and further includes a slant portion which is formed at an end portion of the roof reinforcing member and slants outward and downward, said concave portion is provided to extend inward, in the vehicle width direction, from the end portion of the roof reinforcing member, and the concave portion is comprised of plural concave portions which are arranged away from each other in the vehicle longitudinal direction, a foremost concave portion of which is configured such that an outside end portion thereof approaches gradually closer to the pillars along said slant portion, a rearmost concave portion of which is configured such that an outside end portion thereof goes rearward gradually further away from the foremost concave portion and the depth thereof is shallower than that of the foremost concave portion.

3. The upper vehicle-body structure of a vehicle of claim 1, wherein outside end portions, in the vehicle width direction, of said concave portion and inside end portions, in the vehicle width direction, of said roof side rails are arranged to face to each other and away from each other.

4. The upper vehicle-body structure of a vehicle of claim 1, wherein a sunroof is provided at a roof of the vehicle, a peripheral-frame reinforcing member to reinforce a connection portion of said roof reinforcing member to said pillars is provided at a peripheral frame of the sunroof, and said peripheral-frame reinforcing member and said concave portion of the roof reinforcing member form together a closed cross section.

5. The upper vehicle-body structure of a vehicle of claim 1, wherein an assist-grip attachment seat portion which projects toward the inside of a vehicle compartment is provided at an inside portion, in the vehicle width direction, of a specified portion of said roof side rail which is located further away from said pillar than said roof reinforcing member in the vehicle longitudinal direction, said inflator and said airbag are arranged above and below said assist-grip attachment seat portion, respectively, the inflator is arranged such that a portion thereof positioned nearer the pillar approaches closer to a lower edge portion of the roof side rail, and the airbag comprises a connection portion which is coupled to an end portion of the inflator positioned on the side of the pillar.

6. An upper vehicle-body structure of a vehicle, comprising:
   a pair of right-and-left pillars provided at right and left side portions of the vehicle and extending vertically;
   a pair of right-and-left roof side rails connected to respective upper ends of the pillars and extending in a vehicle longitudinal direction;
   a roof reinforcing member extending in a vehicle width direction over respective upper end portions of the pillars or respective nearby portions to the upper ends of the pillars and arranged in back of said pillars with an offset distance, the roof reinforcing member including plural concave portions which are concaved downward, provided to extend inward, in the vehicle width direction, from the end portion of the roof reinforcing member, and arranged away from each other in the vehicle longitudinal direction and a slant portion which is formed at an end portion of the roof reinforcing member and slants outward and downward; and
   an inflator provided on the inside, in the vehicle width direction, of the pair of roof side rails and capable of supplying a gas pressure to an airbag,
   wherein said inflator is arranged such that at least a portion of the inflator overlaps with said roof reinforcing member in the vehicle longitudinal direction, and a foremost concave portion of said plural concave portions is configured such that an outside end portion thereof approaches gradually closer to the pillars along said slant portion, and a rearmost concave portion of said plural concave portions is configured such that an outside end portion thereof goes rearward gradually further away from the foremost concave portion and a depth thereof is shallower than that of the foremost concave portion.

7. The upper vehicle-body structure of a vehicle of claim 6, wherein outside end portions, in the vehicle width direction, of said concave portions and inside end portions, in the vehicle width direction, of said roof side rails are arranged to face to each other and away from each other.

8. The upper vehicle-body structure of a vehicle of claim 6, wherein a sunroof is provided at a roof of the vehicle, a peripheral-frame reinforcing member to reinforce a connection portion of said roof reinforcing member to said pillars is provided at a peripheral frame of the sunroof, and said peripheral-frame reinforcing member and said concave portions of the roof reinforcing member form together a closed cross section.

9. The upper vehicle-body structure of a vehicle of claim 6, wherein an assist-grip attachment seat portion which projects toward the inside of a vehicle compartment is provided at an inside portion, in the vehicle width direction, of a specified portion of said roof side rail which is located further away from said pillar than said roof reinforcing member in the vehicle longitudinal direction, said inflator and said airbag are arranged above and below said assist-grip attachment seat portion, respectively, the inflator is arranged such that a portion thereof positioned nearer the pillar approaches closer to a lower edge portion of the roof side rail, and the airbag comprises a connection portion which is coupled to an end portion of the inflator positioned on the side of the pillar.

10. An upper vehicle-body structure of a vehicle, comprising:
    a pair of right-and-left pillars provided at right and left side portions of the vehicle and extending vertically;
    a pair of right-and-left roof side rails connected to respective upper ends of the pillars and extending in a vehicle longitudinal direction;
    a roof reinforcing member extending in a vehicle width direction over respective upper end portions of the pillars or respective nearby portions to the upper ends of the pillars and arranged in back of said pillars with an offset distance, the roof reinforcing member including plural concave portions which are concaved downward, provided to extend inward, in the vehicle width direction, from the end portion of the roof reinforcing member, and arranged away from each other in the vehicle longitudinal direction and a slant portion which is formed at an end portion of the roof reinforcing member and slants outward and downward; and
    an inflator provided on the inside, in the vehicle width direction, of the pair of roof side rails and capable of supplying a gas pressure to an airbag,
    wherein said inflator is arranged such that at least a portion of the inflator overlaps with said roof reinforcing member in the vehicle longitudinal direction, and a foremost concave portion of said plural concave portions is configured such that an outside end portion thereof approaches gradually closer to the pillars along said slant portion, and a rearmost concave portion of said plural concave portions is configured such that an outside end portion thereof goes rearward gradually further away from the foremost concave portion and a depth thereof is shallower than that of the foremost concave portion,
    outside end portions, in the vehicle width direction, of said concave portions and inside end portions, in the vehicle width direction, of said roof side rails are arranged to face to each other and away from each other,
    a sunroof is provided at a roof of the vehicle, a peripheral-frame reinforcing member to reinforce a connection portion of said roof reinforcing member to said pillars is provided at a peripheral frame of the sunroof, and said peripheral-frame reinforcing member and said concave portions of the roof reinforcing member form together a closed cross section, and
    an assist-grip attachment seat portion which projects toward the inside of a vehicle compartment is provided at an inside portion, in the vehicle width direction, of a specified portion of said roof side rail which is located further away from said pillar than said roof reinforcing member in the vehicle longitudinal direction, said inflator and said airbag are arranged above and below said assist-grip attachment seat portion, respectively, the inflator is arranged such that a portion thereof positioned nearer the pillar approaches closer to a lower edge portion of the roof side rail, and the airbag comprises a connection portion which is coupled to an end portion of the inflator positioned on the side of the pillar.

* * * * *